United States Patent
Iwamoto et al.

(10) Patent No.: US 8,413,177 B2
(45) Date of Patent: Apr. 2, 2013

(54) INFORMATION-PROCESSING EQUIPMENT

(75) Inventors: Akira Iwamoto, Osaka (JP); Hitoshi Nakatani, Osaka (JP); Masaru Furujiku, Osaka (JP)

(73) Assignee: Panasonic Corporation, Osaka (JP)

( * ) Notice: Subject to any disclaimer, the term of this patent is extended or adjusted under 35 U.S.C. 154(b) by 241 days.

(21) Appl. No.: 12/898,765

(22) Filed: Oct. 6, 2010

(65) Prior Publication Data
US 2011/0214136 A1  Sep. 1, 2011

(30) Foreign Application Priority Data

Oct. 7, 2009  (JP) ................................ 2009-233384
Oct. 7, 2009  (JP) ................................ 2009-233476

(51) Int. Cl.
*G11B 17/03* (2006.01)
*G11B 17/04* (2006.01)
*G06F 1/16* (2006.01)
*H05K 5/00* (2006.01)

(52) U.S. Cl. .............. 720/654; 361/679.33; 361/379.02; 361/679.31

(58) Field of Classification Search .................. 361/683, 361/685, 684, 681, 679.01, 679.02, 679.09, 361/679.21, 679.26, 679.27, 679.31–679.45, 361/679.55, 724–727; 720/600, 654, 657, 720/651, 688–694; 360/900, 903
See application file for complete search history.

(56) References Cited

U.S. PATENT DOCUMENTS

| | | | |
|---|---|---|---|
| 5,305,180 A * | 4/1994 | Mitchell et al. | 361/679.37 |
| 5,455,746 A * | 10/1995 | Sato et al. | 361/816 |
| 6,115,243 A | 9/2000 | Horii | |
| 6,373,706 B1 * | 4/2002 | Kasahara et al. | 361/725 |
| 2002/0125326 A1 * | 9/2002 | Nakjima | 235/476 |
| 2003/0058614 A1 * | 3/2003 | Na et al. | 361/686 |
| 2005/0022214 A1 * | 1/2005 | Ho | 720/600 |
| 2005/0039201 A1 * | 2/2005 | Hsu | 720/657 |
| 2005/0216927 A1 * | 9/2005 | Amitani | 720/651 |
| 2006/0107273 A1 * | 5/2006 | Hisatomi et al. | 720/600 |
| 2006/0242659 A1 * | 10/2006 | Shimada et al. | 720/651 |
| 2008/0043419 A1 * | 2/2008 | Tatsukami | 361/683 |
| 2009/0059504 A1 * | 3/2009 | Iwamoto et al. | 361/683 |
| 2009/0064216 A1 * | 3/2009 | Ishizuka et al. | 720/689 |
| 2009/0083774 A1 * | 3/2009 | Minaguchi et al. | 720/654 |
| 2009/0103259 A1 * | 4/2009 | Nakamura | 361/679.33 |

FOREIGN PATENT DOCUMENTS
JP   10-133776   5/1998
JP   2000-105629   4/2000

* cited by examiner

*Primary Examiner* — Wayne Young
*Assistant Examiner* — Adam B Dravininkas
(74) *Attorney, Agent, or Firm* — Wenderoth, Lind & Ponack, L.L.P.

(57) ABSTRACT

There is provided an information-processing equipment including an optical disc drive 40 within a chassis 31 thereof, the optical disc drive comprising: a turntable 41 for rotatably supporting an optical disc; an optical pickup 42 for recording an information signal onto the optical disc and/or reproducing an information signal recorded on the optical disc, and a movement mechanism 43 for moving the optical pickup in a radial direction of the optical disc; wherein a step part 37 extending in a predetermined direction Ls is formed on an inner surface of the chassis in an area where the optical disc drive is to be fixed, and wherein the optical disc drive is fixed in the area on the inner surface of the chassis at three portions 46A, 46B, 46C positioned straddling the step part.

8 Claims, 10 Drawing Sheets

INFORMATION-PROCESSING EQUIPMENT

BACKGROUND OF THE INVENTION

The present invention relates to information-processing equipment, for example a laptop personal computer (hereinafter called "laptop PC" as an abbreviated expression, appropriately), specifically one that houses an optical disc drive or that further provided with an attachment section for attaching in removable manner an external expansion device having a card-like shape.

As is well known, in information-processing equipment such as laptop PCs, those housing an optical disc drive have become popular. And, as a construction for housing the optical disc drive within the information-processing equipment, a construction in which the optical disc drive is fixed on an inner surface of a bottom wall of a chassis of the information-processing equipment is well known (refer to Japanese Patent Laid-open Publication No. 2000-105629, for example).

Further, in information-processing equipment such as laptop PCs, those having an attachment section for attaching in a removable manner an external expansion device are well known. This external expansion device adds an expanding function from the exterior to the information-processing equipment by inserting a card-type device into the information-processing equipment from the exterior, for example, thereby enabling improvements in the function of the system thereof.

For example, Japanese Patent Laid-open Publication No. 10-133776 discloses mobile electronic equipment provided with a box-shaped chassis and a packaged device which is packaged as a separate module. The box-shaped chassis is provided with a package housing portion formed by a recess having an aperture opening outwardly. And, the packaged device is to be housed into the package housing portion in a removable manner, thereby a part of the packaged device forms a part of an outer surface of the chassis. A CD-ROM driver or a floppy disc drive is incorporated into the packaged device according to the kind of the package. And, the packaged device is replaced with others as required in use.

Figure 14:
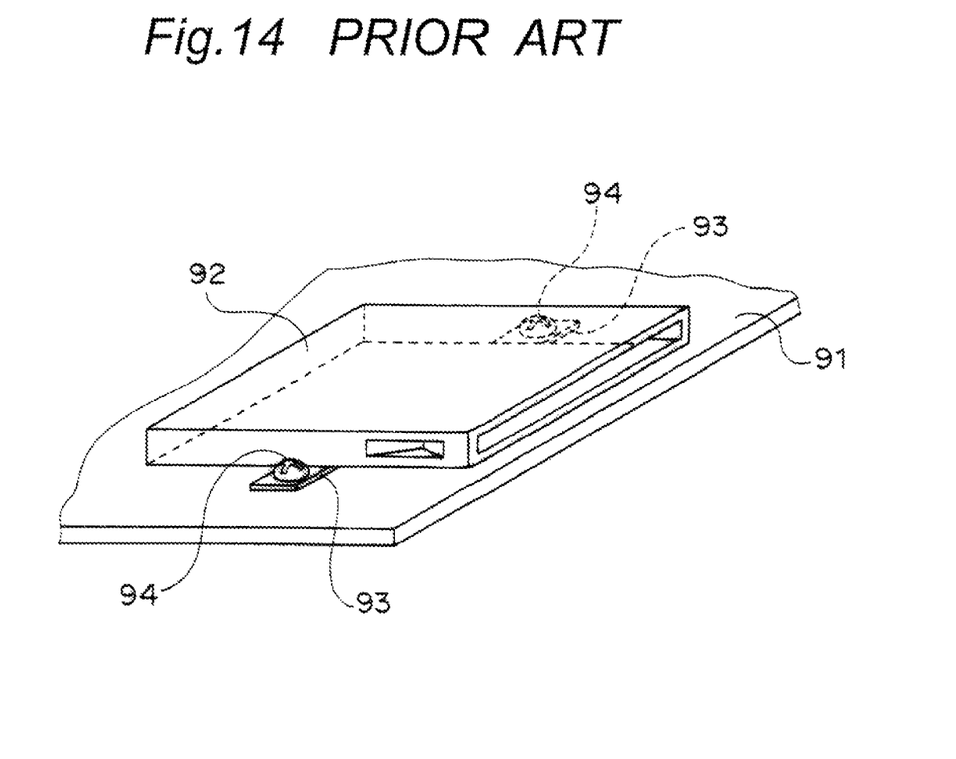
FIG. 14 is a perspective view showing an example of fixed state of a conventional attachment section for a card-type external extension device.

In a case providing the information-processing equipment with the attachment section for attaching in removable manner a card-type external expansion device, it may be conceivable to fix a card-slot member 92 of the attachment section for attaching the external expansion device on a substrate 91 incorporated within the chassis of the information-processing equipment, as shown in FIG. 14, for example. In the example shown in FIG. 14, a pair of fixing projections 93 is provided to the side portions of the card-slot member 92, and those fixing projections 93 are fastened and fixed onto the substrate 91 by using screw members 94, thereby the card-slot member 92 is fixed onto the substrate 91.

As the card-type external expansion device, so-called PC card which is standardized by PCMIA (Personal Computer Memory card Interface Association) is well-known. The "PC card" encompasses the memory cards each containing semiconductor memory and being capable of writing and/or reading out various information, adaptors for small memory cards each smaller than PC card, extender cards each containing a transmitting means and a receiving means for wirelessly transmitting and receiving information, and the like.

Those external expansion devices having card-like shapes are used by inserting and attaching into the card-slot members of the information-processing equipments such as laptop PCs, and applied for individual certification, communication modems and the like. In attaching the card-type external expansion device to the information-processing equipment, if the whole of the external expansion devices having a card-like shape is inserted within the card-slot member, there is a possibility that the capacity of the external expansion device may be limited, wireless communication may be interrupted and the like. Then, recently, in some cases, the card-type external expansion device is arranged to be used in a state where a portion thereof (for example, a portion used for communication module with the exterior) protrudes from the sides of the chassis of the information-processing equipments.

In the case that the card-type external expansion device is used in a state where a portion thereof protrudes from the sides of the chassis of the information-processing equipments, when a impact force is applied from the side to the protruding card-type external expansion device, in the construction shown in FIG. 14, all of the impact force inputted to the card-slot member 92 through the card-type external expansion device is applied to the card-slot member 92 and its fixed portion 93 onto the substrate 91. Accordingly, there is a possibility that the card-slot member 92 itself is subject to deformation and/or failure. Further, there is a possibility that the fixed portion 93 is also subject to deformation and/or failure since it is fixed onto the substrate 91 which has not so high strength in general.

In general, the above-mentioned optical disc drive includes: a turntable for rotatably supporting an optical disc; an optical pickup for recording an information signal onto the optical disc and/or reproducing an information signal recorded on the optical disc, and a movement mechanism for moving the optical pickup in a radial direction of the optical disc. And, in order to keep operating accuracy of each section of the optical pickup including the accuracy of its optical axis and the moving accuracy and to fulfill its function without trouble, the optical disc drive must be kept in a firmly fixed state.

On the other hand, in recent years, in accordance with growing request for making information-processing equipments such as laptop PCs lighter and thinner, the bottom wall of the chassis is also requested to be made more thin, and, with its progress, the rigidity of the bottom wall, especially flat portions thereof, inevitably tends to decrease.

However, conventionally, the optical disc drive is, in many cases, fixed in flat area on the inner surface of the bottom wall of the chassis of the information-processing equipment. Under the circumstances in which the bottom wall is made thinner, the rigidity of the flat area itself on which the optical disc drive is to be fixed is insufficient.

That is, when an external force is applied to the bottom of the chassis, the flat area on which the optical disc drive is to be fixed is rather easily deformed since its rigidity tends to be insufficient. It may cause a disadvantage in keeping a required operating accuracy of the optical pickup including the accuracy of its optical axis and the moving accuracy.

SUMMARY OF THE INVENTION

The present invention was made in view of the foregoing technical problems. One of the basic objects of the present invention is, in the information-processing equipment including the optical disc drive, to enhance the rigidity of the area in the inner surface of the chassis on which the optical disc drive is fixed and to enable to maintain the optical disc drive in a firmly fixed state as possible even if a external force is applied to the area in the inner surface of the chassis.

And, a further basic object of the present invention is, in a case where such an information-processing equipment is provided with the attachment section for attaching in removable manner the card-type external expansion device, to enable to suppress the deformation and/or damage of the card-slot member of the attachment section and the fixed portion thereof even if a impact force is applied from the side to the attachment section through the card-type external expansion device.

Therefore, an information-processing equipment according to the present invention includes an optical disc drive within a chassis thereof, the optical disc drive comprising: a turntable for rotatably supporting an optical disc; an optical pickup for recording an information signal onto the optical disc and/or reproducing an information signal recorded on the optical disc, and a movement mechanism for moving the optical pickup in a radial direction of the optical disc, wherein a step part extending in a predetermined direction is formed on an inner surface of the chassis in an area where the optical disc drive is to be fixed, and wherein the optical disc drive is fixed in the area on the inner surface of the chassis at three portions positioned straddling the step part.

In the present invention, the step part extending in the predetermined direction is formed on the inner surface of the chassis in the area where the optical disc drive is to be fixed, thereby, it is possible to enhance the rigidity of the area in the inner surface of the chassis when a external force is applied. Further, in the present invention, the optical disc drive is fixed in the area on the inner surface of the chassis at three portions positioned straddling the step part, thereby, it is possible to maintain the optical disc drive in a firmly fixed state as possible even if a external force is applied to the area in the inner surface of the chassis. And, it is possible to contribute to maintaining a required operating accuracy of the optical pickup including the accuracy of its optical axis and the moving accuracy.

In the above-mentioned information-processing equipment, it may be preferable that the extending direction of the step part intersects with a moving direction of the optical pickup.

According to this construction, the extending direction of the step part intersects with a moving direction of the optical pickup. Therefore, even when a bending load around the extending direction of the step part is applied to the inner surface of the chassis on which the optical disc drive is to be fixed, an influence on the moving accuracy of the optical pickup can be further reduced in comparison with a case where the extending direction of the step part and the moving direction of the optical pickup are parallel to each other.

In the above-described cases, it may be preferable that a stand-by position of the optical pickup is set in an elevated region formed by the step part.

Input of an external load by e.g., dropping the information-processing equipment tends to take place much more in non-operating conditions (that is, the conditions in which the optical pickup is located at the stand-by position) than in operating conditions. According to the construction, the stand-by position of the optical pickup is set in the elevated region which is spaced-apart by a height of the step part from the chassis itself with higher possibility of direct input of the external load by e.g., dropping the information-processing equipment, and of which the rigidity is enhanced by providing with the step part. Therefore, even when the external load by e.g., dropping the information-processing equipment is applied in its non-operating condition, an influence on the optical pickup and the moving accuracy thereof can be effectively reduced. The effect of enhancing the rigidity of the elevated region by providing with the step part is more remarkable, specifically at the portion nearer to the step part (more specifically, to a corner formed by the step part) in the elevated region. Therefore, more preferably, the nearer the stand-by position of the optical pickup is set to the step part (more specifically, to a corner formed by the step part) in the elevated region, the more effectively the influence on the optical pickup and the moving accuracy thereof can be reduced when the external load by e.g., dropping the information-processing equipment is applied.

Further, in the above-described cases, it may be preferable that a spindle motor for rotatably driving the turntable is fixed in an elevated region formed by the step part.

The spindle motor is the heaviest one among the major components of the optical disc drive, therefore, when the external load is inputted to the optical disc drive by e.g., dropping the information-processing equipment, the operation of the optical disc drive may be subject to a remarkable influence by the fact that the spindle motor is subject to the external load. According to the construction, the spindle motor is fixed on the elevated region which is spaced-apart by a height of the step part from the chassis itself with higher possibility of direct input of the external load by e.g., dropping the information-processing equipment, and of which the rigidity is enhanced by providing with the step part. Therefore, even when the external load by e.g., dropping the information-processing equipment is applied, an influence on the operation of the optical disc drive can be effectively reduced. The effect of enhancing the rigidity of the elevated region by providing with the step part is more remarkable, specifically at the portion nearer to the step part (more specifically, to a corner formed by the step part) in the elevated region. Therefore, more preferably, the nearer the fixed position of the spindle motor is set to the step part (more specifically, to a corner formed by the step part) in the elevated region, the more effectively the influence on the operation of the optical disc drive can be reduced when the external load by e.g., dropping the information-processing equipment is applied.

Still further, in the above-described cases, it may be preferable that an other step part extending in a direction substantially parallel with said step part is formed on the inner surface of the chassis, and that a recess is formed on an outer surface of the chassis in corresponding to an elevated region formed by both the step parts, and further that an attachment section for attaching in removable manner a card-type external expansion device is provided in the recess.

According to this construction, the attachment section for attaching in removable manner the card-type external expansion device is configured by effectively utilizing recess formed on an outer surface of the chassis in corresponding to an elevated region formed by both the step parts, and it is possible to contribute to compactification of the information-processing equipment. In other words, it is possible to enhance the rigidity of the inner surface of the chassis by utilizing the step part which is formed by arranging such an attachment section.

Further, in this case, it may be preferable that the recess has an opening on a side surface of the chassis, and has an enough depth to accommodate a card-slot member for inserting the external expansion device thereinto, and that the card-slot member is fixed to the recess in a state where the card-slot member is accommodated in the recess so that right-and-left outer side surfaces of the card-slot member which respectively correspond to right-and-left side of the external expansion device are close to at least a part of vertical walls of the recess.

According to this construction, the card-slot member is fixed to the recess in a state where the card-slot member is accommodated in the recess so that right-and-left outer side surfaces of the card-slot member which respectively correspond to right-and-left side of the external expansion device are close to at least a part of vertical walls of the recess. Accordingly, in the case that the card-type external expansion device is used in a state where a portion thereof protrudes from the sides of the chassis of the information-processing equipment, even when a impact force is applied from the side to the protruding card-type external expansion device, the impact force (when it is larger than a certain level) is received not only by the card-slot member and the fixed portion thereof but also by the vertical walls of the recess close to right-and-left outer side surfaces of the card-slot member. As a result, it is possible to suppress the deformation and/or damage of the card-slot member of the attachment section and the fixed portion thereof even if a impact force is applied from the side to the attachment section through the card-type external expansion device, in comparison with the conventional case where all of the impact force inputted into the card-slot member is applied to the card-slot member of the attachment section and the fixed portion thereof.

Moreover, the card-slot member is fixed to the recess which is a part of the chassis of the information-processing equipment. Accordingly, it is possible to enhance the fixation strength of the card-slot member, in comparison with the conventional case where the card-slot member is fixed onto the substrate which has not so high strength, it is possible to more effectively suppress the deformation and/or damage of the card-slot member and the fixed portion thereof.

Furthermore, in this case, it may be preferable that a cover member for covering a back side of the attachment section is disposed on a back side of the card-slot member, the cover member having a shutter of a slot opening, which corresponds to an opening of the recess on the side surface of the chassis, for inserting the external expansion device into the card-slot member and withdrawing the same from the card-slot member, and the cover member also being fixed to the recess.

According to this construction, the cover member having a shutter for inserting the external expansion device into the card-slot member and withdrawing the same from the card-slot member is fixed to the recess which is a part of the chassis of the information-processing equipment. Accordingly, even when a impact force is applied from the side to the protruding card-type external expansion device, the impact force (when it is larger than a certain level) is received not only by the card-slot member and the fixed portion thereof but also by the vertical walls of the recess close to right-and-left outer side surfaces of the card-slot member. As a result, it is also possible to suppress the deformation and/or damage of the slot opening corresponding to the shutter. Moreover, one side of the card-slot member is fixed to the recess which is a part of the chassis of the information-processing equipment, and back side of the card-slot member is covered by the cover member fixed to the recess, thereby it is possible to further enhance the fixation strength of the card-slot member.

BRIEF DESCRIPTION OF THE DRAWINGS

The present invention will be described in more detail with reference to the accompanying drawings.

DETAILED DESCRIPTION OF THE PREFERRED EMBODIMENTS

Hereinafter, an embodiment of the present invention will be explained in detail, by taking a laptop PC as an example, with reference to the accompanying drawings.

In the following description, some terms which respectively indicate specific directions ("up", "down", "left", "right" and other terms include their concept, "clockwise direction", "counter-clockwise direction", for example) may be used. However, it is to be noted that those terms are used to facilitate understanding of the present invention with reference to the accompanying drawings. And, the present invention should not be interpreted in a limited way by meanings of those terms.

Figure 1:
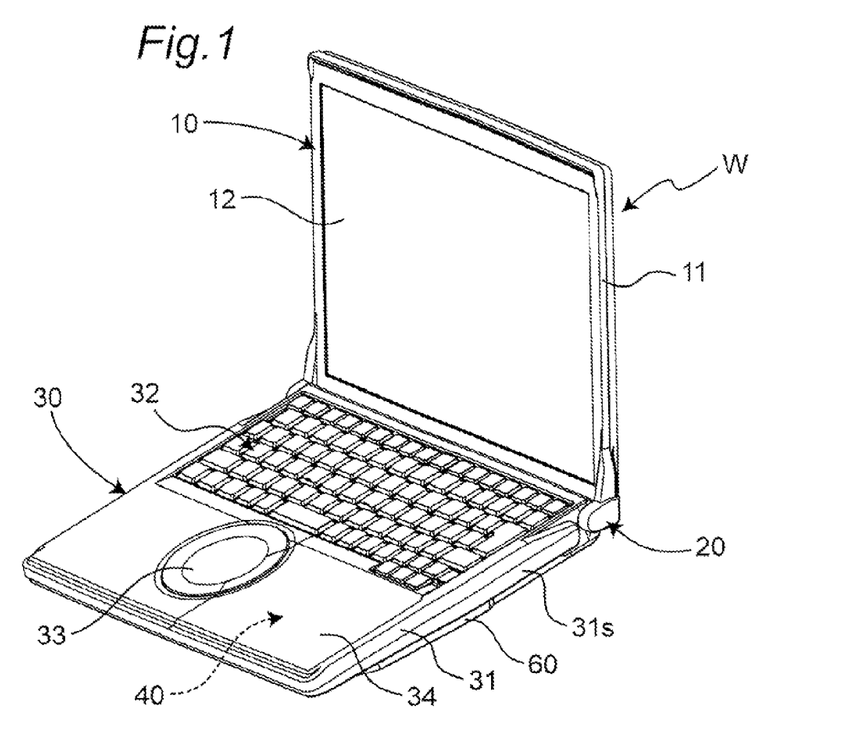
FIG. 1 is an overall perspective view of a laptop PC according to an embodiment of the present invention in an enabled state.
Figure 2:
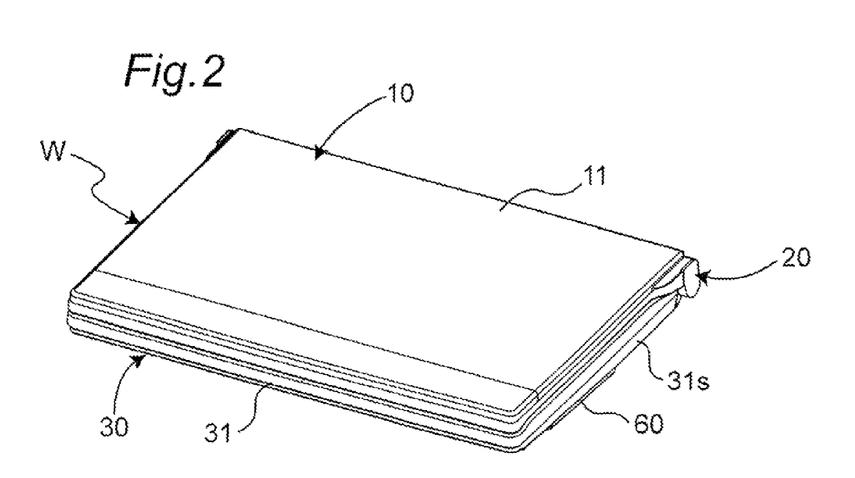
FIG. 2 is an overall perspective view of the laptop PC in a nonuse state.
Figure 3:
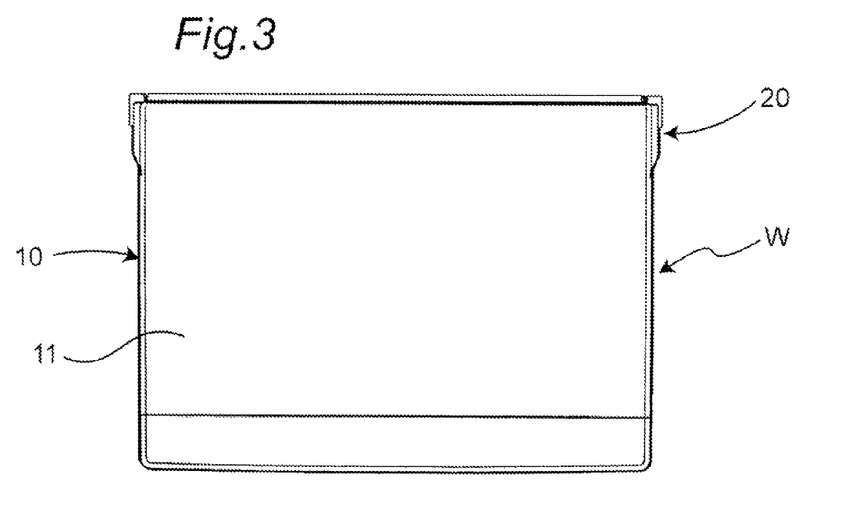
FIG. 3 is a plane view of the laptop PC in a nonuse state.
Figure 4:
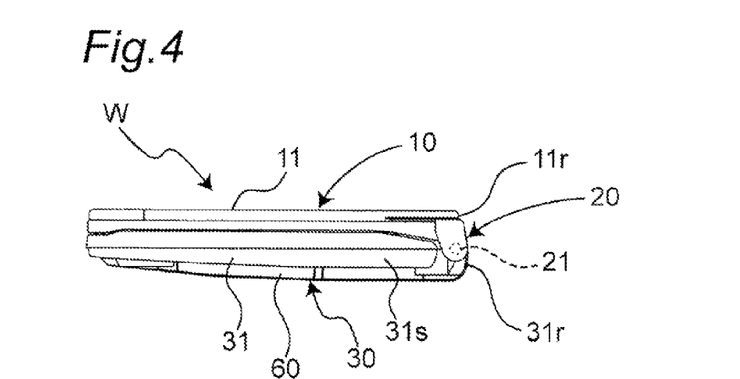
FIG. 4 is a side view of the laptop PC in a nonuse state.
Figure 5:
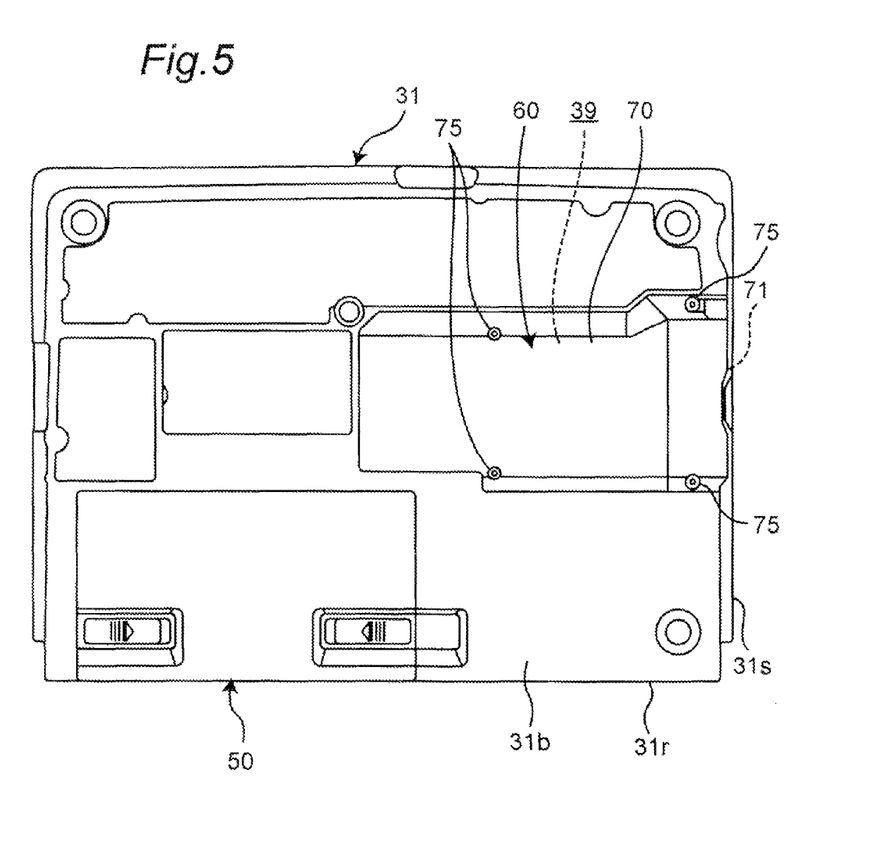
FIG. 5 is a bottom view of the laptop PC in a nonuse state.

FIGS. 1 and 2 are perspective views showing the laptop PC according to the present embodiment in an enable state and a nonuse (closed) state. And, FIGS. 3, 4 and 5 are a plane view, a side view and a bottom view of the laptop PC in the nonuse (closed) state.

As shown in these drawings, the laptop PC W as an electronic equipment according to the present invention is provided with a display section 10 having a display screen 12 such as a liquid crystal type, and an operation control section 30 capable of generating a display signal which is to be inputted into the display section 10. The operation control section 30 includes an input device 32 such as a keyboard, signal processing circuits for generating display signals outputted to the display section based on input operations by the input device, a central processing unit (so-called CPU: not shown), and peripheral components thereof (also, not shown).

Also, a touch-pad 33 is provided on a near side viewing from a user in a state the user operates the laptop PC W, the user can conduct a cursor motion, a scroll of the display screen 12 and the like only by going over the touch-pad 33 from right to left or up and down with the finger.

In the present embodiment, a lid (cover member) 34 which is openable and closable up and down is arranged at the side (right side in FIG. 1) of the touch-pad 33, and an optical disc drive 40 is embedded under the lid 34. The optical disc drive 40 will be explained in detail later.

The display section 10 is accommodated in a chassis 11 (a first chassis) for the display section side, and a periphery and a back face of the display section 10 are covered by the first chassis. On the other hand, the operation control section 30 is accommodated in a chassis 31 (a second chassis) for the operation control section side. And both the chassis are coupled to each other by a hinge mechanism 20 in a relatively openable and closable manner.

In more detail, both the first chassis 11 and the second chassis 31 have an overall basic shape of substantially rectangle in a planar view (that is, in a state of viewing from the front side thereof). And, one side (the first side) 11r of the first chassis 11 and one side (the first side) 31r of the second chassis 31 (that is, both the rear sides viewing from the user in a operating state where said user operates the laptop PC W) are coupled via the hinge mechanism 20. Thereby, the first chassis 11 and the second chassis 31 can move in a relatively openable and closable manner around a hinge axle 21 (refer to FIG. 4). It is to be noted that the "rectangle" includes a "square" as one configuration thereof in the present specification.

The laptop PC W can be driven by electricity supplied thereto from rechargeable batteries, for example. And, as shown in FIG. 5, a battery pack 50 formed from a unitized rechargeable battery is mounted at the rear side of the bottom of the laptop PC W in a removable manner.

Further, as shown in FIG. 5, a PC card attachment section 60 for attaching in a removable manner a PC card as a card-type external expansion device is provided at a bottom of middle part in front-back direction of the laptop PC W. And, an outside (lower side) of the attachment section 60 is covered by a cover member 70 made of, for example, resin. A shutter 71 for opening and closing a slot-opening of the PC card attachment section 60 is arranged on a side surface 31s (right side surface in FIG. 5) of the second chassis 31. The construction of the PC card attachment section 60 will be explained in detail later.

Figure 6:
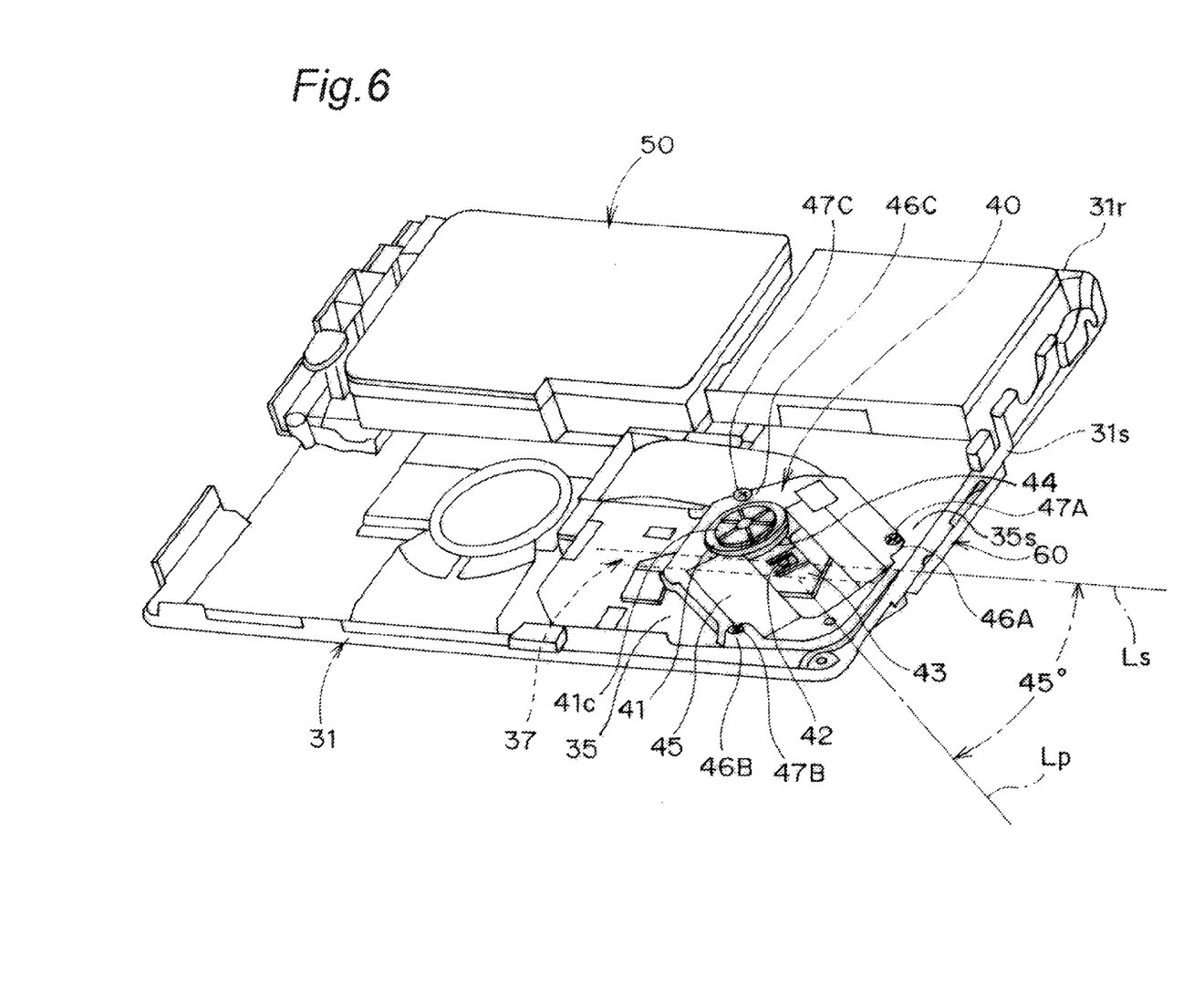
FIG. 6 is a perspective view showing an internal construction of a second chassis of the laptop PC.

FIG. 6 is a perspective view showing an internal construction of the second chassis 31 of the laptop PC W by removing the upper portion of the second chassis 31, including the lid 34. As shown in FIG. 6, an optical disc drive 40 for performing at least one of reproducing an information signal recorded on the optical disc (not shown) and recording an information signal onto the optical disc is housed under the lid 34.

The optical disc drive 40 includes, as basic constituent elements, a turntable 41 for rotatably supporting an optical disc; an optical pickup 42 for recording an information signal onto the optical disc and/or reproducing an information signal recorded on the optical disc, and a movement mechanism 43 for moving the optical pickup 42 in a radial direction Lp of the optical disc. The turntable 41 includes a chuck means 41c for chucking the optical disc on the inner diameter side thereof. And, all of those basic constituent elements are supported on a base plate 45. A spindle motor 44 for rotatably driving the turntable 41 is positioned under a lower surface of the base plate 45. The optical pickup 42 can be moved in the radial direction Lp of the optical disc along a pair of guide rails 43g (refer to FIG. 9 explained later) by the movement mechanism 43. It is to be noted that the optical disc drive 40 has the same construction and the same function as those of conventionally known optical disc drive. Therefore, more detailed explanation and illustration will be omitted.

The base plate 45 of the optical disc drive 40 is fixed onto the bottom wall 35 of the second chassis 31, at three fixed portions 46A, 46B, 46C which respectively define triangle vertices, by using screw members 47A, 47B, 47C.

Figure 7:
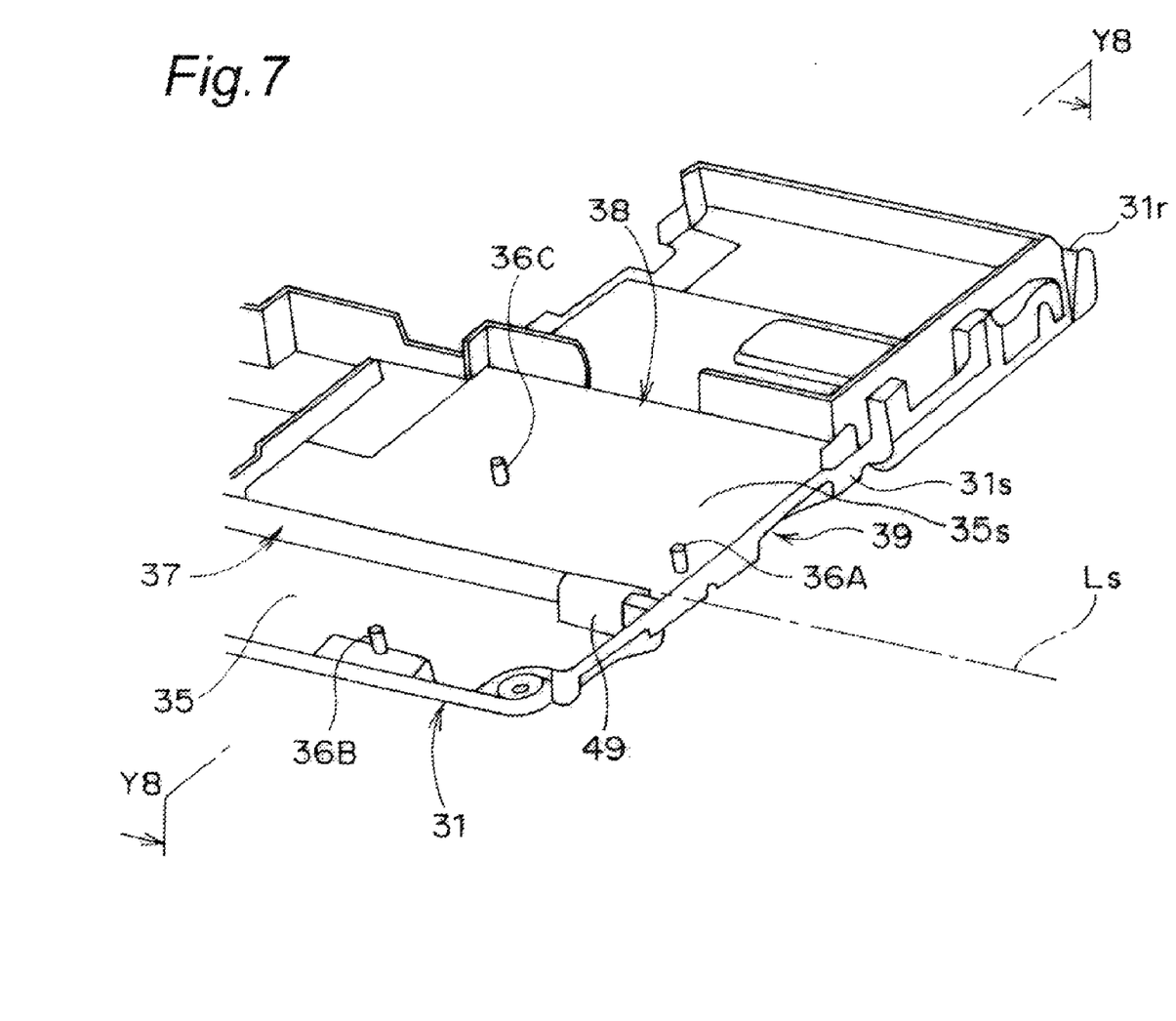
FIG. 7 is a perspective view showing an inner surface of the bottom of the second chassis.

FIG. 7 is a perspective view showing an inner surface of the bottom wall 35 of the second chassis 31. As shown in FIG. 7, in an inner surface of the bottom wall 35, fixing bosses 36A, 36B, 36C are integrally-projected from the inner surface of the bottom wall 35 at the positions corresponding to those of three fixed portions 46A, 46B, 46C of the base plate 45 in the optical disc drive 40.

Female screws for screwing together with the screw members 47A, 47B, 47C are configured on the fixing bosses 36A, 36B, 36C. After fitting three fixed portions 46A, 46B, 46C of the base plate 45 into the fixing bosses 36A, 36B, 36C of the bottom wall 35, respectively, screwing the screw members 47A, 47B, 47C into the female screws of the fixing bosses 36A, 36B, 36C, thereby the base plate 45 of the optical disc drive 40 is tightened and fixed to the bottom wall 35 of the second chassis 31. A shock-absorbing material such as rubber cushion may be appropriately interposed between the fixed portions 46A, 46B, 46C and the fixing bosses 36A, 36B, 36C. Thereby, the vibration of spindle motor 44 is reduced when the turntable 41 of the optical disc drive is rotated.

In the present embodiment, as described above (refer to FIG. 1), a lid 34 which is openable and closable up and down is arranged at the near side viewing from a user in a state the user operates the laptop PC W, and at the side of the touch-pad 33 (i.e., at so-called hand-rest part of the second chassis 31). The optical disc drive 40 is embedded under the lid 34.

Figure 9:
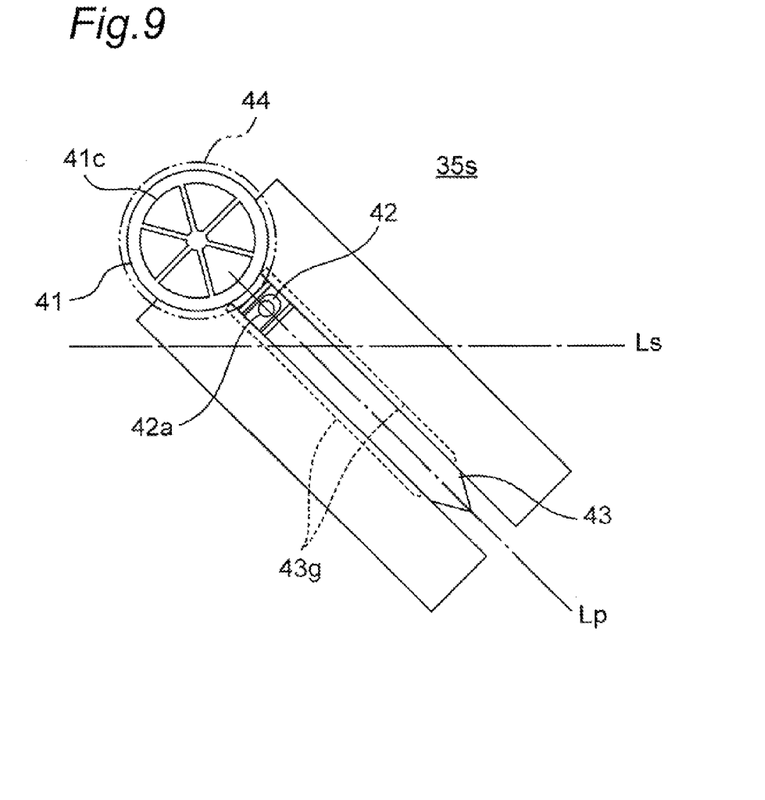
FIG. 9 is a plane view showing a major portion of an optical disc drive in the laptop PC.

In such a type of optical disc drive 40, as better shown in FIG. 9, the turntable 41 rotatably driven by the spindle motor 44 does not travel, only the optical pickup 42 travels along the guide rails 43g of the movement mechanism 43, in corresponding to the recording/reproducing operation to/from the optical disc lied on the turntable 41. This constitution also appears in, for example, portable type audio players, portable type digital video disc players and the like.

When the lid 34 is closed again after it is opened and the optical disc is set onto the turntable 41, the turn table 41 start to rotate and the optical pickup 42 travels to a desired position from the stand-by position shown in FIG. 9 in corresponding to the rotation of the turntable 41, then starts to emit a laser beam from an objective lens 42a of the optical pickup 42. The optical pickup 42 emitting laser beam read out information recorded at innermost of the optical disc supported on the turntable 41, thereby the kind of disc and the like is detected.

In the present embodiment, as shown in FIG. 9, the stand-by position of the optical pickup 42 is set to a position corresponding to the innermost of the optical disc supported on the turntable 41.

Among the major components of the optical disc drive 40, the heaviest one is the spindle motor 44 for rotating the turntable 41. Therefore, when the optical disc drive 40 is subject to a disturbance (an externally inputted load) by e.g., dropping the laptop PC W, the operation of the optical disc drive 40 may be subject to a remarkable influence by the fact that the spindle motor 44 subjects to an impact load. Accordingly, it is important to enhance the resistance characteristic against the impact load applied to the spindle motor 44 when the optical disc drive 40 is subject to the disturbance.

In a condition where the optical disc drive 40 is not operated (non-operating condition), for example, in a condition where the laptop PC W is under transfer, the optical pickup 42 always rests at the stand-by position. Dropping of the laptop PC W tends to take place much more in non-operating conditions than in operating conditions. Accordingly, it is important to reduce the influence on the optical pickup 42 in the stand-by position, when the dropping of the laptop PC W takes place.

In the present embodiment, a step part (a front-side step) 37 is formed on the bottom wall 35 of the second chassis 31, the step part 37 extends in a direction Ls which is substantially parallel to the rear side 31r of the second chassis 31 and is substantially perpendicular to the side surface 31s. The step part 37 is configured to extend across the area where the base plate 45 of the optical disc drive 40 is to be fixed. By forming such a step part 37, the rigidity of the area where the optical disc drive 40 is to be fixed is enhanced. The extending direction Ls of the step part 37, more preferably, intersects with a moving direction Lp of the optical pickup 42 of the optical disc drive 40 by a certain degrees (approximately 45 degrees in the present embodiment: refer to FIG. 6).

Figure 8:
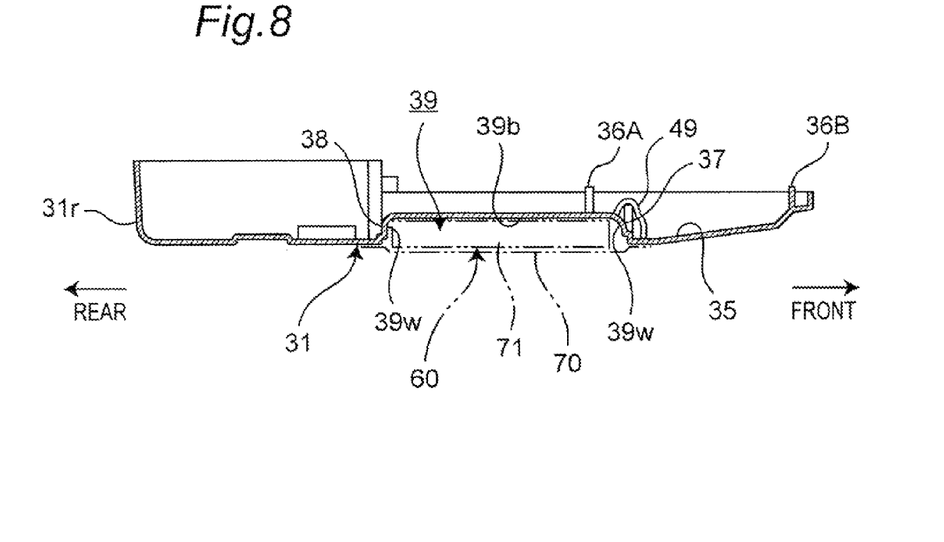
FIG. 8 is a cross-sectional view taken along a line Y8-Y8 in FIG. 7.

FIG. 8 is a vertical cross-sectional view taken along a line Y8-Y8 in FIG. 7, and illustrating the vertical cross-sectional construction of the bottom wall 35 of the second chassis 31. As is well understood from FIG. 8, the front-side step part 37 is formed so that it rises up by a predetermined amount from front side to rear side of the bottom wall 35. Further, a rear-side step part 38 is formed at a portion rearward from the front-side step part 37 by a predetermined distance. The rear-side step part 38 is formed so that it descends down by a predetermined amount from front side to rear side of the bottom wall 35. The rear-side step part 38 inclines in reverse direction to the inclined surface which constitutes the front-side step part 37. A elevated region 35s of the bottom wall 35 formed by the front-side step part 37 and the rear-side step part 38 therebetween is configured to a flat wall on which the base plate 45 of the optical disc drive 40 is placed. The base plate 45 is arranged to be parallel to an optical disc supporting surface of the turntable 41. In addition, numeral symbol 49 denotes a flexible circuit board.

As explained above, the elevated region 35s formed between the front-side step part 37 and the rear-side step part 38 is rather small, and its area is smaller than that of whole the second chassis 31. Therefore, remarkable effect of enhancing the rigidity can be obtained by forming the front-side step part 37 and the rear-side step part 38.

Furthermore, a recess 39 having a predetermined width and depth which protrudes upwards from an outer side (lower side in FIG. 8) to an inner side (upper side in FIG. 8) of the bottom wall 35 is formed. The above-described PC card attachment section 60 is configured in the recess 39. The recess 39 is provided with a bottom wall 39b and front-and-rear a pair of vertical walls 39w which are located at the front-and-rear ends of the bottom wall 39b, and those vertical walls 39w correspond to the above-described step parts 37, 38.

To put it in more detail, the occupied area of the optical disc drive 40 in the bottom wall 35 of the second chassis 31 is much larger than that of the PC card attachment section 60, and the PC card attachment section 60 is arranged on back side of the optical disc drive 40 so as to sandwich the bottom wall 35 between them. Therefore, inevitably there exist boundary parts caused by the difference between the occupied area of the optical disc drive 40 and that of the PC card attachment section 60. The above-described front-side step part 37 and rear-side step part 38 are corresponding to those boundary parts. These boundary parts (front-side step part 37 and rear-side step part 38) extend from the side surface 31s of the second chassis 31 in a direction perpendicular to the side surface 31s on the bottom wall 35.

In the present embodiment, in order to keep the optical disc drive 40 in a more stable condition, three fixing bosses 36A, 36B, 36C respectively corresponding to three fixed portions 46A, 46B, 46C of the base plate 45 in the optical disc drive 40 are positioned straddling the front-step part 37. That is, one fixing bosses 36B is positioned forward of the front-step part 37 and remain two fixing bosses 36A, 36C are disposed rearward of the front-step part 37.

As described above, according to the present embodiment, by forming the front-side step part 37 and the rear-side step part 38 in the bottom wall 35 of the second chassis 31, it is possible to enhance the rigidity of the bottom wall 35 of the second chassis 31 and increase the toughness of the second chassis 31. Especially, by forming the step part 37 (front-side step part), in the area where the optical disc drive 40 is to be fixed, which extends in the predetermined direction Ls and extends across the above-described area, it is possible to enhance the rigidity of the area in the bottom wall 35 of the second chassis 31 when a external force is applied.

Further, in the present embodiment, the optical disc drive 40 is fixed on the bottom wall 35 of the second chassis 31 at three fixed portions 46A, 46B, 46C disposed straddling the front-side step part 37, thereby, it is possible to maintain the optical disc drive 40 in a firmly fixed state as possible even if a external force is applied to the area of the bottom wall 35 where the optical disc drive 40 is fixed. And, it is possible to remarkably contribute to maintaining a required operating accuracy of the optical pickup 42 including the accuracy of its optical axis and the moving accuracy.

Furthermore, the extending direction Ls of the front-side step part 37 intersects with the moving direction Lp of the optical pickup 42. Therefore, when a bending load around the extending direction Ls of the front-side step part 37 is applied to the bottom wall 35 on which the optical disc drive 40 is to be fixed, an influence on the moving accuracy of the optical pickup 42 can be further reduced in comparison with a case where the extending direction Ls of the front-side step part 37 and the moving direction Lp of the optical pickup 42 are parallel to each other.

As described above, the optical pickup 42 travels along the pair of the guide rails 43g, near the informational layer of the optical disc, in the radial direction thereof. According to the present embodiment, since the extending direction Lp of the guide rails 43g intersects with the extending direction of the front-side step part 37, the effect on maintaining the parallelism can be obtained more remarkably by utilizing the corner of the step part 37 which has the highest resistance characteristic against mechanical deformation.

Still further, input of an external load (an impact load, more specifically) by e.g., dropping the laptop PC W tends to take place much more in non-operating conditions (that is, the conditions in which the optical pickup 42 is located at the stand-by position) than in operating conditions. In the present embodiment, the stand-by position of the optical pickup 42 is set in the elevated region 35s of the bottom wall 35 formed by the front-side step part 37 and the rear-side step part 38 therebetween That is, according to the present embodiment, the stand-by position of the optical pickup 42 is set in the elevated region 35s which is spaced-apart by a height of the step parts 37, 38 from the bottom wall 35 of the second chassis 31 with higher possibility of direct input of the external load by e.g., dropping the laptop PC W, and of which the rigidity is enhanced by providing with the step parts 37, 38. Therefore, even when the external load by e.g., dropping the laptop PC W equipment is applied to it in its non-operating condition, an influence on the optical pickup 42 and the moving accuracy thereof can be effectively reduced. The effect of enhancing the rigidity of the elevated region 35s by providing with the front-side step part 37 is more remarkable, specifically at the portion nearer to the corner formed by the step part 37 in the elevated region 35s. Therefore, more preferably, the nearer the stand-by position of the optical pickup 37 is set to the corner of the front-side step part 37, the more effectively the influence on the optical pickup 42 can be reduced when the external load by e.g., dropping the laptop PC W is applied.

Still further, as explained above, the spindle motor 44 is the heaviest one among the major components of the optical disc drive 40, therefore, when the external load (the impact load, more specifically) is inputted to the optical disc drive 40 by e.g., dropping the laptop PC W, the operation of the optical disc drive 40 may be subject to a remarkable influence by the fact that the spindle motor 44 is subject to the external load. In the present embodiment, the spindle motor 44 is fixed on the elevated region 35s of the bottom wall 35 formed by the front-side step part 37 and the rear-side step part 38 therebetween.

That is, according to the present embodiment, the spindle motor 44 is fixed on the elevated region 35s which is spaced-apart by the height of the step parts 37, 38 from the bottom wall 35 of the second chassis 31 with higher possibility of direct input of the external load by e.g., dropping the laptop PC W, and of which the rigidity is enhanced by providing with the step parts 37, 38. Therefore, even when the external load by e.g., dropping the laptop PC W is applied to the spindle motor 44, an influence on the operation of the optical disc drive 40 can be effectively reduced. The effect of enhancing the rigidity of the elevated region 35s by providing with the front-side step part 37 is more remarkable, specifically at the portion nearer to the corner formed by the step part 37 in the elevated region 35s. Therefore, more preferably, the nearer the fixed position of the spindle motor 44 is set to the corner of the front-side step part 37, the more effectively the influence on the optical pickup 42 can be reduced when the external load by e.g., dropping the laptop PC W is applied.

Still further, in the present embodiment, the recess 39 is formed on the outer surface of the bottom wall 35 in corresponding to the elevated region 35s formed by elevating the bottom wall 35, which is formed by arranging the front-side step parts 37 and the rear-side step part 38 substantially parallel to each other. And, the PC card attachment section 60 for attaching in removable manner the PC card can be configured by effectively utilizing the recess 39, and it is possible to contribute to compactification of the laptop PC W. In other words, it is possible to enhance the rigidity of the bottom wall 35 of the second chassis 31 by utilizing the step parts 37, 38 which are formed by arranging such a PC card attachment section 60.

To put it in more detail, the front-side step part 37 and the rear-side step part 38 extend from the side surface 31s of the second chassis 31 in a direction perpendicular to the side surface 31s on the bottom wall 35 of the second chassis 31, and the guide rails 43g of the movement mechanism 43 of the optical disc drive 40 incline (by 45 degrees) with respect to the extending direction of the step part 37, 38, thereby the impact-resistance of the optical disc drive 40 and the PC card attachment section 60 can be enhanced. Further, since the optical disc drive 40 and the PC card attachment section 60 are arranged on the front and back of the bottom wall 35, the both components 40, 60 can be fixed on the bottom wall 35. Thereby, in arranging the both components 40, 60, it is also possible to achieve the compactification of the laptop PC W in addition to the improvement of the impact-resistance thereof.

As better shown in FIG. 6 etc., the occupied area of the optical disc drive 40 in the bottom wall 35 of the second chassis 31 is much larger than that of the PC card attachment section 60. Then, in other words, in arranging the optical disc drive 40 and the PC card attachment section 60 on the front and back of the bottom wall 35 of the second chassis 31, the step parts 37, 38 are formed by utilizing the fact that the occupied area of the PC card attachment section 60 is smaller than that of the optical disc drive 40, and the impact-resistance of the laptop PC W is enhanced by utilizing the arrangement of such step parts 37, 38.

In the above-explained embodiment, the flat wall surface forming the recess 39 is provided on the outer surface of the bottom wall 35 in order to arrange the PC card attachment section 60. However, when only enhancing the mechanical property is required, it may be enough to bend parts of bottom wall 35 corresponding to the positions where the fixing bosses 36A and 36C are formed, for example.

As described above (refer to FIG. 5, for example), a PC card attachment section 60 for attaching in removable manner so-called PC card as a card-type external expansion device is provided at a bottom of middle part in front-back direction of the laptop PC W. PC card is inserted or withdrawn against the side surface 31s of the second chassis 31.

Hereinafter, the PC card attachment section 60 will be explained in detail.

Figure 10:
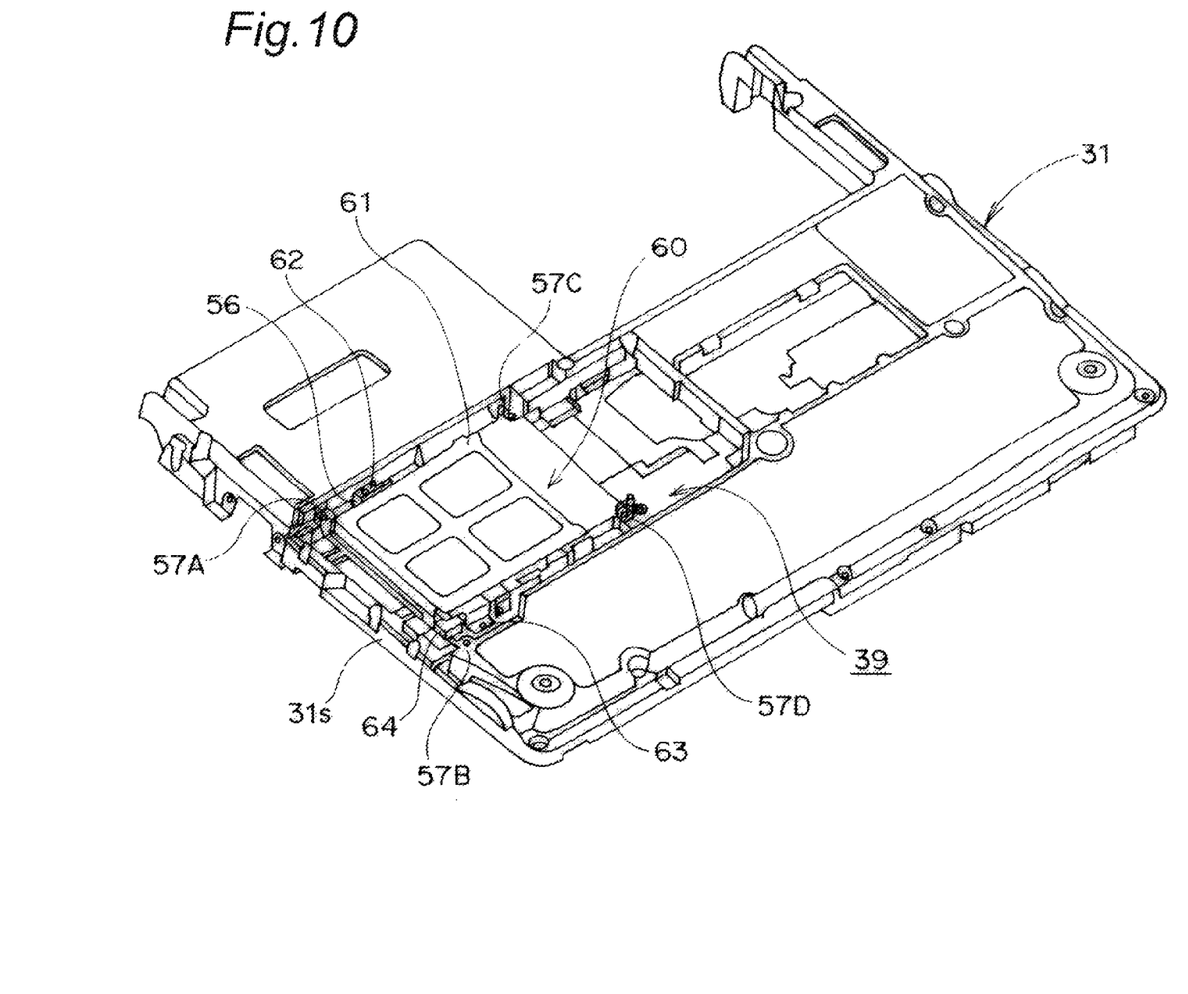
FIG. 10 is a perspective view showing an internal construction of a PC card attachment section of the laptop PC.
Figure 11:
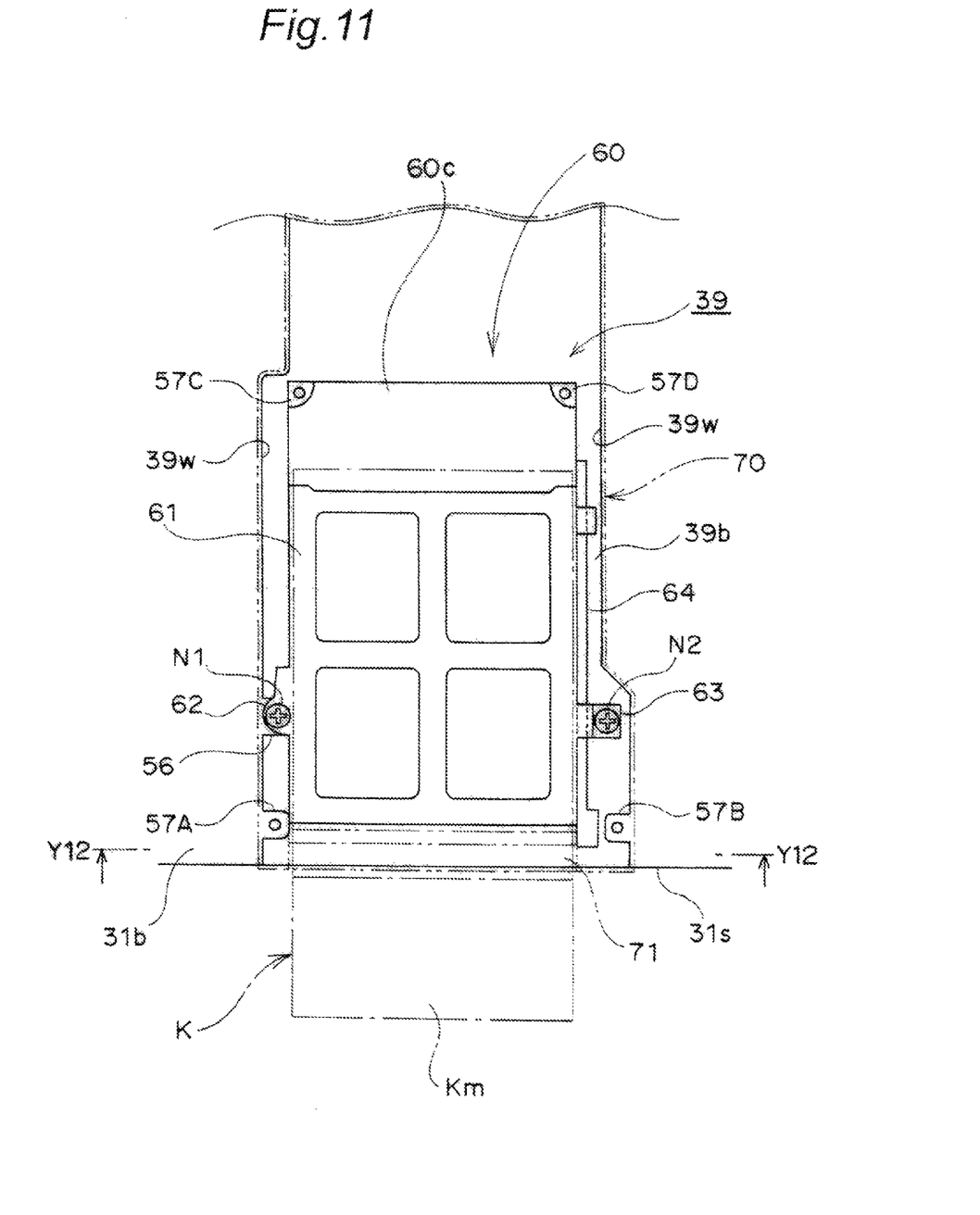
FIG. 11 is an enlarged bottom view showing in close-up the PC card attachment section.
Figure 12:
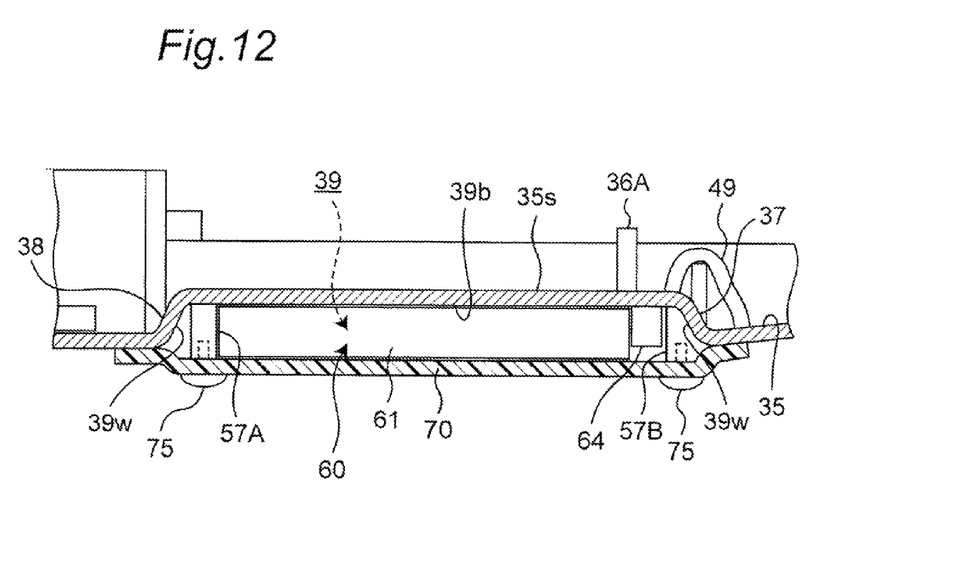
FIG. 12 is a cross-sectional view taken along a line Y12-Y12 in FIG. 11.

FIG. 10 is a perspective view showing an internal construction of the PC card attachment section 60 of the laptop PC W; FIG. 11 is an enlarged bottom view showing in close-up the PC card attachment section 60, FIG. 12 is a cross-sectional view taken along a line Y12-Y12 in FIG. 11, and FIG. 13 is an enlarged side view showing in close-up a slot opening of the PC card attachment section 60 in the second chassis 31.

Figure 13:
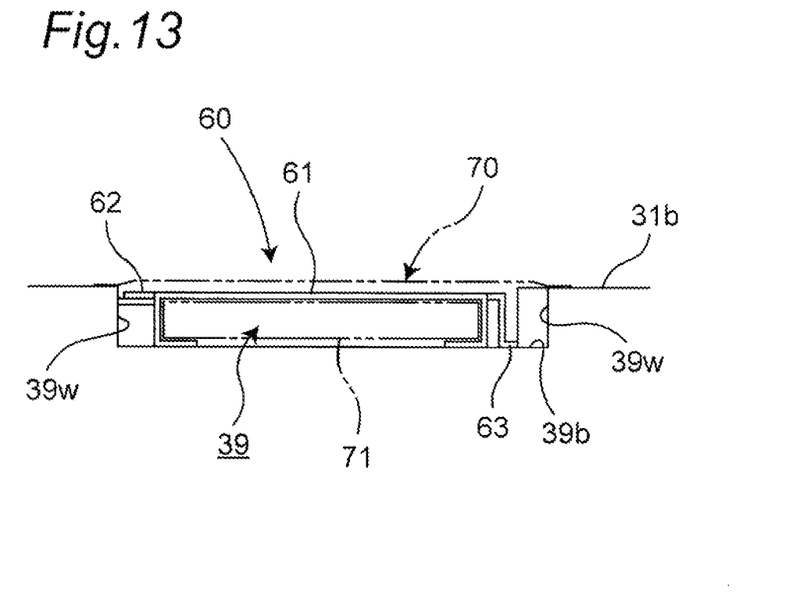
FIG. 13 is an enlarged side view showing in close-up a slot opening of the PC card attachment section in the second chassis.

As shown in those drawings, a recess 39 is formed at a part of a back surface 31b continuous from a side surface 31s of the second chassis 31, the recess 39 having a predetermined depth (refer to FIG. 13). And, a card-slot member 61 of the PC card attachment section 60 is accommodated in the recess 39. The card-slot member 61 is manufactured by punching operation and bending work for a metal plate having predetermined thickness. And, the card-slot member 61 is accommodated in the recess 39 so that right-and-left outer side surfaces of the card-slot member which respectively correspond to right-and-left side of the PC card K (refer to FIG. 11) are close to at least a part of vertical walls 39w of the recess 39. The depth of the recess 39 is determined so as to accommodate the card-slot member 61 therein.

In the present embodiment, the PC card K is provided with a communication module Km for communicating with the exterior, for example. And, as shown by a chain line in FIG. 11, in the state where the PC card K is attached from the side surface 31s of the second chassis 31 to the PC card attachment section 60, at least the communication module Km projects outward from the side surface 31s of the second chassis 31.

As shown in FIGS. 10 and 11, fixing projections 62, 63 for fixing the card-slot member 61 in the recess 39 are provided on the side of the card-slot member 61 relatively close to the side surface 31s of the second chassis 31. One of the fixing projection 62 (the left side one in FIG. 11) is fixed, by using a screw member N1, onto a fixing boss 56 integrally formed with the vertical wall 39w and the bottom wall 39b of the recess 39. While, the other fixing projection 63 (the right side one in FIG. 11) is extended toward the bottom wall 39b of the recess 39 so that it sandwiches a ejector member 64 together with the outside surface of the card-slot member 61, thereafter bended in parallel to the bottom wall 39b, and then directly fixed onto the bottom wall 39b by using a screw member N2.

Further, fixing bosses 657A, 57B for fixing the cover member 70 in the recess 39 are provided on the side more close to the side surface 31s of the second chassis 31 than the fixing projections 62, 63 of the card-slot member 61. The fixing bosses 657A, 57B are integrally formed with the vertical wall 39w and the bottom wall 39b of the recess 39. The left-side (in FIGS. 11 and 12) fixing boss 57A substantially contacts with the left outside surface of the card-slot member 61, and the right-side (in FIGS. 11 and 12) fixing boss 57B gets close to the ejector member 64 extending along the right outside surface of the card-slot member 61 in close contact therewith.

In the case that the PC card K is used in a state where a portion Km thereof protrudes from the side 31s of the second chassis 31, when a impact force is applied from the right side (in FIGS. 11 and 12) to the protruded portion Km, the impact force (when it is larger than a certain level) is received not only by the card-slot member 61 and the fixing projection 62, 63 thereof but also by a part of the vertical wall 39w of the recess 39 close to the left outside surfaces of the card-slot member 61, more specifically, by the left-side (in FIGS. 11 and 12) fixing boss 57A.

On the other hand, when a impact force is applied from the left side (in FIG. 11) to the protruded portion Km, the impact force (when it is larger than a certain level) is received not only by the card-slot member 61 and the fixing projection 62, 63 thereof but also by a part of the vertical wall 39w of the recess 39 close to the right outside surfaces of the card-slot member 61 (that is, the ejector member 64 in close contact therewith), more specifically, by the right-side (in FIGS. 11 and 12) fixing boss 57B.

Furthermore, right-and-left a pair of fixing bosses 57C, 57D for fixing the cover member 70 in the recess 39 are provided on the side farther from the side surface 31s of the second chassis 31 than the fixing bosses 57A, 57B. The cover member 70 integrally has a shutter 71 of a slot opening for inserting the PC card-K into the card-slot member 61 and withdrawing the same from the card-slot member 61. The slot opening and the shutter 71 are disposed so as to correspond to the opening formed in the recess 39 which opens to the side surface 31s of the second chassis 31.

The resin-made cover member 70 is disposed to cover the back-side of the card-slot member 61 and fixed in the recess 39, by arranging the cover member 70 over the back-side of the card-slot member 61 and positioning it against the fixing bosses 57A, 57B, 57C and 57D, thereafter applying screw members 75 (refer to FIG. 12 and FIG. 5). As to the fixing bosses 57C and 57D located at distal side from the side surface 31s of the second chassis 31, the screw members 75 is applied through the holes formed near the connector section 60c of the PC card attachment section 60, thereby the cover member 70 is fixed to the recess 39.

In a fixed state of the cover member 70, where it covers the back side of the card-slot member 61, the cover member 70 and the back surface of the bottom wall 35 of the second chassis 31 lay nearly side-by-side to form substantially flat face.

The recess 39 is integrally configured with the second chassis 31, and four fixing bosses 57A, 57B, 57C, 57D formed on the recess 39, the card-slot member 61 and the cover member 70 are connected by using screw members, thereby, the impact-resistance of the laptop PC W is remarkably enhanced.

As described above, the card-slot member 61 of the PC card attachment section 60 is fixed to the recess 39 in a state where the card-slot member 61 is accommodated in the recess 39 so that right-and-left outside surfaces of the card-slot member 61 which respectively correspond to right-and-left side of the PC card K are close to at least a part of vertical wall 39w of the recess 39.

Accordingly, in the case that the PC card K is used in a state where a portion Km thereof protrudes from the side 31s of the second chassis 31, even when a impact force is applied from the side to the protruded portion Km of the PC card K, the impact force (when it is larger than a certain level) is received not only by the card-slot member 61 and the fixing portion 62, 63 but also by a part of the vertical walls 39w of the recess 39 close to right-and-left outside surfaces of the card-slot member 61 (more specifically, the right-and-left fixing bosses 57A, 57B in FIGS. 11 and 12).

As a result, it is possible to suppress the deformation and/or damage of the card-slot member 61 of the PC card attachment section 60 and the fixing projections 62, 63 thereof even if a impact force is applied from the side to the attachment section 60 through the PC card-K, in comparison with the conventional case where all of the impact force inputted into the card-slot member is applied to the card-slot member of the attachment section and the fixed portion thereof. Moreover, the card-slot member 61 is fixed to the recess 39 which is a part of the second chassis 31 of the laptop PC W. Accordingly, it is possible to enhance the fixation strength of the card-slot member 61, in comparison with the conventional case (refer to FIG. 14) where the card-slot member is fixed onto the substrate which has not so high strength, and it is possible to more effectively suppress the deformation and/or damage of the card-slot member 61 and the fixed portion thereof.

Also, the cover member 70 having the shutter 71 for inserting the PC card K into the card-slot member 61 and withdrawing the same from the card-slot member 61 is fixed to the recess 39 constitutes a part of the second chassis 31 of the laptop PC W. Accordingly, even when a impact force is applied from the side to the protruded portion Km of the PC card K, it is also possible to suppress the deformation and/or damage of the slot opening corresponding to the shutter 71. Moreover, one side of the card-slot member 61 is fixed to the recess 39 which is a part of the second chassis 31 of the laptop PC W, and back side of the card-slot member 61 is covered by the cover member 70 fixed to the recess 39, thereby it is possible to further enhance the fixation strength of the card-slot member 61.

It is to be noted, although the above described embodiment exemplify a laptop PC, that the present invention is not limited to the above-described embodiment, and is effectively applicable also to various other information-processing equipments housing an optical disc drive or further including an attachment section for detachably attaching a card-type external expansion device such as PC card.

As described above, the present invention is not limited to the aforementioned embodiments and modification examples, and it goes without saying that various changes and modifications of designs and the like can be made without departing from the split thereof.

What is claimed is:

1. Information processing equipment comprising an optical disc drive and a chassis, wherein the optical disc drive includes:
   a turntable for rotatably supporting an optical disc;
   an optical pickup for recording an information signal onto the optical disc and/or reproducing an information signal recorded on the optical disc; and
   a movement mechanism for moving the optical pickup in a radial direction of the optical disc,
   wherein a step part extending in a predetermined direction is formed on an inner surface of the chassis in an area where the optical disc drive is fixed,
   wherein the inner surface of the chassis includes a first fixing point and a second fixing point on opposite sides of the step part from each other,
   wherein the optical disc drive is fixed to the chassis at the first fixing point and the second fixing point,
   wherein another step part extending in a direction substantially parallel with said step part is formed on the inner surface of the chassis, wherein the step parts form an elevated region on the inner surface of the chassis and form a recess on an outer surface of the chassis, wherein a recess is formed on an outer surface of the chassis in an area corresponding to the elevated region formed by both the step parts, and an attachment section for attaching in removable manner a card-type external expansion device is provided in the recess, wherein the recess has an opening on a side surface of the chassis, and has enough depth to accommodate a card-slot member for inserting the external expansion device thereinto, and wherein the card-slot member is fixed to the recess in a state where the card-slot member is accommodated in the recess so that right-and-left outer side surfaces of the card-slot member which respectively correspond to right-and-left side of the external expansion device are close to at least a part of vertical walls of the recess.

2. The information processing equipment of claim 1, wherein the extending direction of the step part intersects with a moving direction of the optical pickup.

3. The information processing equipment of claim 1, wherein a stand-by position of the optical pickup is set in the elevated region formed by the step part.

4. The information processing equipment of claim 1, wherein a spindle motor for rotatably driving the turntable is fixed in the elevated region formed by the step part.

5. The information processing equipment of claim 1, wherein a cover member for covering a back side of the attachment section is disposed on a back side of the card-slot member, wherein the cover member has a shutter of a slot opening, which corresponds to the opening of the recess on the side surface of the chassis, for inserting the external expansion device into the card-slot member and withdrawing the same from the card-slot member, and wherein the cover member is fixed to the recess.

6. The information processing equipment of claim 1, wherein the optical disc drive extends across the elevated region.

7. Information processing equipment comprising an optical disc drive and a chassis, wherein the optical disc drive includes:

a turntable for rotatably supporting an optical disc;

an optical pickup for recording an information signal onto the optical disc and/or reproducing an information signal recorded on the optical disc; and a movement mechanism for moving the optical pickup in a radial direction of the optical disc, wherein a step part extending in a predetermined direction is formed on an inner surface of the chassis in an area where the optical disc drive is fixed, wherein another step part extending in a direction substantially parallel with said step part is formed on the inner surface of the chassis, wherein the step parts form an elevated region on the inner surface of the chassis and form a recess on an outer surface of the chassis, wherein a card-slot member for attachment of an external expansion device is disposed on an outer side of the chassis in the recess and between the step parts, wherein a cover member covers the card-slot member, and wherein the cover member is attached to the outer surface of the chassis and the card-slot member is disposed between the chassis and the cover member.

8. The information processing equipment of claim 7, wherein the optical disc drive extends across the elevated region.

* * * * *